May 23, 1967  L. A. WRIGHT  3,320,862
FORCE MULTIPLYING AND SAFETY POWER CYLINDER
Filed March 23, 1965  2 Sheets-Sheet 1
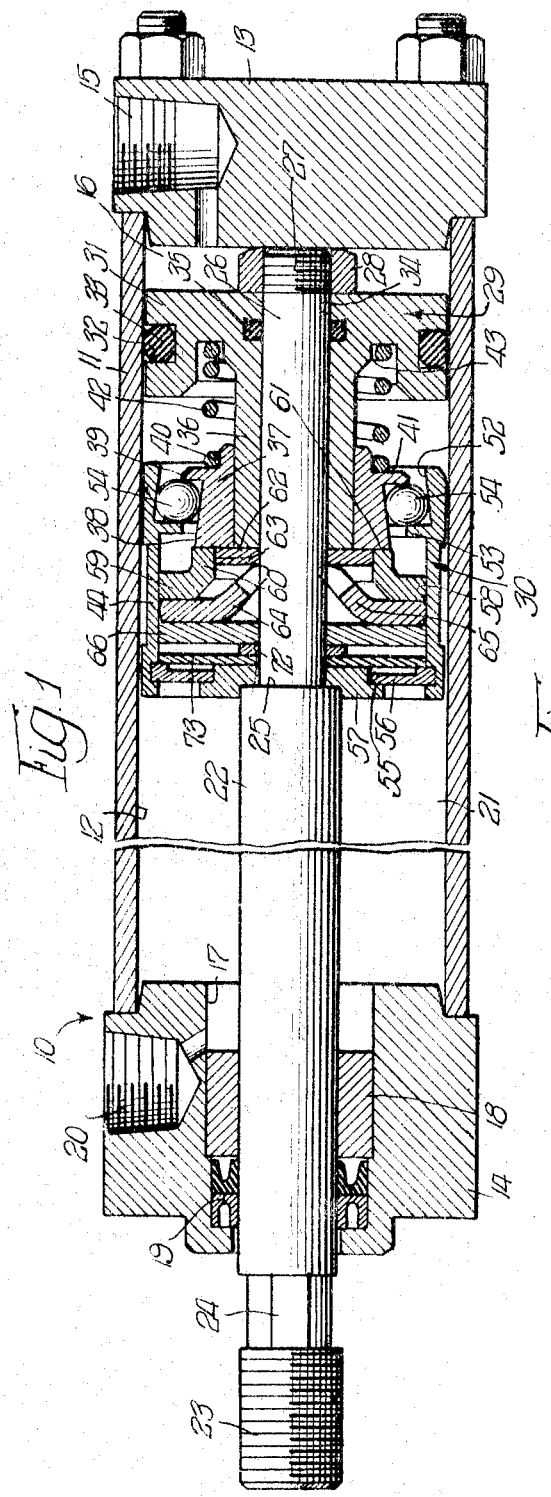
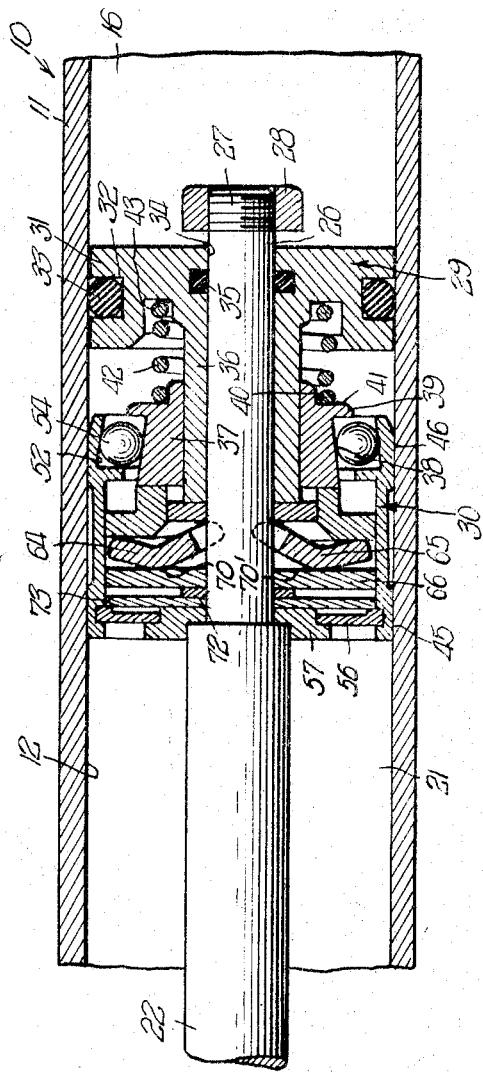
Inventor:
Lee A. Wright,
By W. A. Morey, atty.

May 23, 1967  L. A. WRIGHT  3,320,862
FORCE MULTIPLYING AND SAFETY POWER CYLINDER
Filed March 23, 1965  2 Sheets-Sheet 2
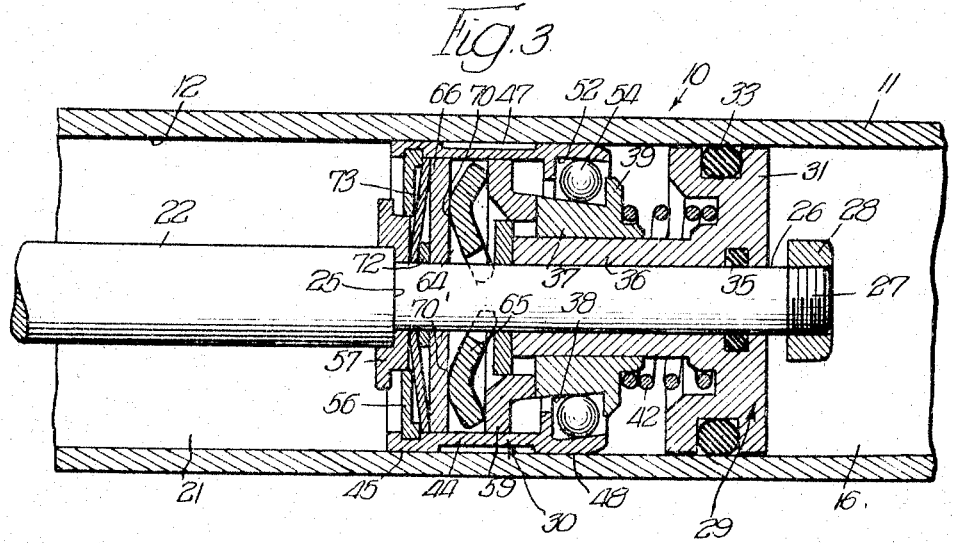
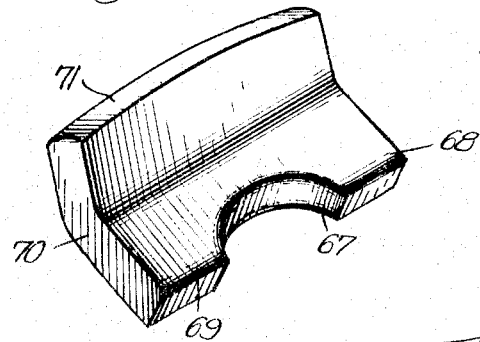
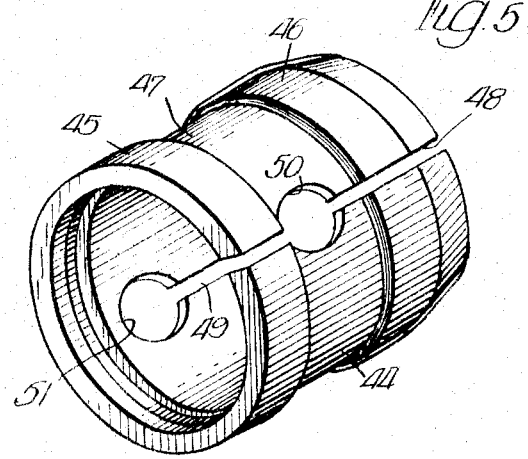
Inventor:
Lee A. Wright

United States Patent Office

3,320,862
Patented May 23, 1967

3,320,862
FORCE MULTIPLYING AND SAFETY
POWER CYLINDER
Lee A. Wright, Kettering, Ohio, assignor to Compressed Air Service Co., Moraine, Ohio, a corporation of Ohio
Filed Mar. 23, 1965, Ser. No. 442,120
11 Claims. (Cl. 92—25)

This invention relates to a device commonly known as a safety cylinder, and more particularly is directed to a fluid motor having a locking means disposed within the cylinder which will be actuated to a locked condition on the application of a resisting force of predetermined magnitude to the piston rod.

Broadly speaking, safety cylinders are not in and of themselves new to the trade. Safety cylinders employing a variety of mechanisms to lock the piston and/or rod to the associated cylinder under emergency conditions are well known. Release of the locking force is usually affected by a reversal of the direction of fluid pressure, by a manual release or the like.

Notwithstanding the acceptance by consumers of prior art prototypes falling within the general category, they have not been without their shortcomings, for example, in the area of simplicity of design, versatility of application to pistons and cylinders over a wide design range, locking performance without injuring the working parts of the piston and cylinder, and lastly, their failure to provide dependable functioning over wide fields of applications and environments after prolonged use.

The present invention provides a safety cylinder having resilient means interposed between a piston slidably mounted on a piston rod and a locking mechanism carried by the rod. As the rod is extended it may encounter resistance at any point in its working stroke. Should this resistance be greater than the relatively light force of the resilient means, the piston will move along the piston rod, actuating both the locking means and a force multiplying apparatus associated with the locking means. When so actuated, the locking means frictionally engages the cylinder wall, and the continued fluid pressure against the piston, acting through the force multiplying means, increases the force acting on the rod. Should the resistance encountered be a firm unyielding object the increased force will be exerted as a clamping force, holding the object securely between the rod and a fixed vice jaw or the like. However, should the object encountered be resilient or yielding, such as a human hand, damage or injury will not occur, since the maximum possible movement of the rod after actuation of the locking means is limited to a safe distance. Unlocking may be achieved by a reversal of the application of pressure.

Through the use of the present design, accurate functioning is obtainable with parts manufactured with standard equipment and minimum machining under standard commercial tolerances. Moreover, the present design using such parts will function within accepted limits even after prolonged periods of use resulting in normal wearing of the moving parts. A better appreciation of the present invention can be had by considering the objects achieved and a detailed description of a representative embodiment.

It is a general object of the present invention to provide a new and improved safety cylinder.

It is a further object of this invention to provide a new and improved safety cylinder which may be readily manufactured through the application of the usual manufacturing methods without impairment of the accurate functioning of the finished device.

It is a further object of this invention to provide a new and improved fluid motor having a locking means actuated by the resisting force applied to the piston rod, which force causes the activation of a locking means to lock the piston rod against further movement of substantial magnitude relative to the cylinder.

It is a further object of this invention to provide a new and improved safety cylinder which locks the piston and rod against further movement when the piston rod encounters a firm object.

It is a still further object of this invention to provide a new and improved safety cylinder having a locking mechanism which is actuated by a low predetermined resisting force applied to the piston rod, and which includes means to actuate the locking mechanism when a yieldable object is encountered and thereafter drive the rod a short predetermined distance as said object yields.

Another important object of this invention is the provision of a fluid motor of the type described which upon encountering resistance to movement will actuate a locking mechanism and thereafter exert an increased force against an unyielding object or continue movement for a short predetermined distance against a yielding object.

A further important object of this invention is the provision of a fluid cylinder and piston device particularly useful in clamping articles in position which is adapted to exert against such articles a force greater than the product of the fluid pressure and the area of the piston.

Further and fuller objects will become readily apparent when reference is made to the accompanying drawings wherein:

FIG. 1 is a fragmentary longitudinal or axial cross section of a fluid motor embodying a cylinder and piston having a locking means of the present invention carried on a piston rod which is shown in full lines;

FIG. 2 is a fragmentary longitudinal cross section similar to FIG. 1 illustrating the relation of the parts of the locking mechanism when the piston rod encounters a firm resisting force;

FIG. 3 is a view similar to FIG. 2 illustrating the relationship of the parts of the locking mechanism when the piston rod encounters a yielding object;

FIG. 4 is a perspective view of a radially acting lever forming a part of the locking mechanism; and FIG. 5 is a perspective view of the locking bushing also forming a part of the locking mechanism.

Referring now to FIG. 1, the safety cylinder 10 of the present invention includes a cylinder 11 having a central bore 12 of uniform diameter from one end to the other, or at least in the region of the piston stroke. The cylinder 11 is closed off at opposite ends by means of end caps 13 and 14, which may be held in place by any suitable arrangement such as long bolts or the like.

The end cap 13 is provided with a fluid inlet 15 to permit the introduction of working fluid to the chamber 16, defined by the piston, cylinder and end cap 13. End cap 14 is provided with a central bore 17 of increased diameter, receiving sleeve bearing 18 and scraper-seal 19. A fluid port 20 permits working fluid to be admitted on the rod side of the piston into the chamber, indicated generally at 21.

A piston rod 22 is provided at the outer end with threads 23 to permit attachment to the mechanism to be driven by the fluid motor. Wrench flats 24 may be provided adjacent the thread means. The intermediate portion of the piston rod 22 may be of substantially uniform diameter to co-operate with the bearing 18 and seal 19. A shoulder 25 is formed by turning the inner end 26 of the piston rod 22 to a reduced diameter relative to the intermediate portion. The end 26 of the piston rod 22 is threaded, as at 27, and receives a nut 28 which holds the piston head assembly, indicated generally at 29 and locking mechanism indicated generally at 30 on the end of the piston rod 22 between the shoulder 25 and the nut 28.

Included in the piston assembly 29, is an annular piston head 31 of a diameter which approximates the inside diameter 12 of the cylinder 11. The annular piston head 31 is provided with an annular groove 32 to receive fluid sealing means such as the O-ring indicated at 33. An axially extending tubular sleeve portion 36 is formed integral with the piston head 31. A central bore 34 extends through the head 31 and sleeve portion 36 to receive the reduced end portion 26 of the piston rod 22. A sealing ring 35 is disposed in a groove in the bore 34 and seals the head to the rod.

The locking means 30 includes an expansion bushing 37 disposed about the tubular sleeve 36 with a bearing fit. The outer circumferential portion 38 of the expansion bushing 37 is shaped to a frusto-conical contour terminating near the end of minimum diameter in a radially extending flange portion 39. A section of reduced diameter 40 on the opposite side of the flange portion 39 forms a radial shoulder 41 to receive a compression spring 42 disposed around the sleeve portion 36 and having the opposite end buttomed in a guide portion 43 in the piston head 31. The importance of the function of the compression spring 42 will become more apparent when a description of the operation of the device is given.

The locking assembly 30 further includes an expansible locking bushing 44 which is illustrated in FIGS. 1 and 5 and is provided with annular collar portions 45 and 46 at opposite ends, formed by machining an annular circumferential groove 47 in the central section of the locking bushing 44. The locking bushing is provided with axially extending slits or cuts 48 and 49 which may terminate in stress relieving holes 50 and 51 positioned centrally of the groove 47. Obviously, the number of slits or cuts in any given bushing will be determined by the particular application. One of the slits 48 and 49 may extend the entire axial length of the bushing 44 to facilitate assembly of the locking components herein.

Referring once again to FIG. 1, at the right-hand end of the locking bushing 44, the inner circumference is shaped to a flared or frusto-conical section 52 which terminates in a radially extending flange or shoulder 53, the latter being spaced axially from the radially extending flange portion 39 on the expansion bushing 37. A plurality of expansion ball members 54 are disposed in the annular space defined by the flanges 39 and 53. The expansion ball members 54 are adapted to contact the outer circumferential portion 38 of the expansion bushing 37 and the inner circumferential portion 52 of the locking bushing 44 to expand the latter upon relative axial movement.

Land 45 on locking bushing 44 is grooved on its inner surface to receive and retain a locating washer 56. A locating bushing 57, having an axially extending boss 55, is fitted over the reduced portion 26 of the rod 22 abutting the shoulder 25, with the boss projecting through the locating washer 56.

The inside diameter of the locking bushing 44 below the groove 47 and land 45, indicated at 58, forms a cylindrical or annular bore of substantial uniform diameter. A thrust bushing 59, generally L-shaped in cross section, is received within the locking bushing 44 with the outer circumferential portion of the upstanding leg of the L slidably disposed within the annular bore 58, while the axially extending portion 60 is in engagement with a radially extending end face 61 on the expansion bushing 37. A thrust washer 62 is slidably received within the inner circumferential portion 63 on the axially extending portion of the L-shaped thrust bushing 59 and is fitted around piston rod 22 abutting the end surface of piston sleeve portion 36.

A pair of radially acting thrust levers 64 and 65 have the outer margins disposed within the bore 58 and axially confined between a thrust plate 66 and the thrust bushing 59. The thrust plate 66 has the outer periphery slidably received within the bore 58 in the locking bushing and is bored to be received on reduced portion 26 of the piston rod 22 with a sliding fit also.

The structure of the thrust levers 64 and 65, which may be two or more in number, is best illustrated in FIG. 4. The peripheral portions 71, shown as radially disposed in FIG. 1, have rounded edges curved to form a segment of a circle having a radius approximating the radius of bore 58. The opposite or inner edge of each lever is formed wtih a centrally disposed opening 67 adapted to fit around reduced portion 26 of rod 22, and defining lugs 68 and 69 on either side of the opening 67. Between the peripheral portions 71 and the opening 67, each lever is bent, as shown in cross section in FIG. 1, thus defining a fulcrum 70 at the apex. The locking levers 64 and 65 are arranged around the reduced section 26 of rod 22 within bore 58 of bushing 44 between thrust plate 66 and thrust bushing 59 with the lugs 68 and 69 in contact with thrust washer 62.

The position of the apex 70 with respect to the lugs 68 and 69 and to the periphery 71 determines the force multiplying effect of my safety cylinder. For instance, if the distance from the lugs 68 and 69 to the periphery 71 is twice the distance from the apex to periphery 71, the lever ratio is 2:1 and the clamping force the rod can exert will be approximately double that otherwise attainable from the pressure fluid.

A spacer washer 72 is received around the reduced end portion 26 of the piston rod 22 engaging the thrust plate 66, and acts against the radial inner margin of a washer-type spring 73. The periphery of the washer-type spring engages the locating washer 56 and acts to urge washer 72 toward nut 28 when distorted as in FIG. 3.

From the foregoing description of the respective components of the safety cylinder it can be appreciated that it consists of parts which comparatively speaking, may be readily manufactured by inexpensive techniques. Moreover, it will be seen that the arrangement is such that it will compensate for normal wearing of the moving parts without requiring maintenance of close tolerances as demanded by prior art devices.

As previously pointed out, the embodiment shown in FIG. 1 illustrates the piston rod 22, piston head assembly 29 and locking assembly 30 in the relationship or condition assumed when at rest and no pressure is applied, or when the piston is advancing with only the normal or expected resistance to travel. The piston face abuts the nut 28 and the locking bushing abuts the shoulder 25 and the spring 42 is extended to its preloaded dimension.

When pressure fluid is admitted to chamber 16, the fluid acting against the end of the piston rod 22 and the working face of the piston head 31 develops a force which causes the piston rod 22 to extend. Pivoting movement of the radial levers 64 and 65 about the fulcrums 70 and 70' is prevented by the force of the spring 42 acting through the expansion bushing 37 and L-shaped thrust bushing 59 against the outer portion of the radial levers. The spring 42 may be preloaded and any desired constant chosen to exert any desired force against the expansion bushing 37. Accordingly, so long as the reacting force acting against movement of the piston rod to the left does not exceed the spring force, the components will remain in balanced relationship as shown in FIG. 1.

When piston rod 22 encounters a firm or non-yielding obstruction, the piston rod 22 stops. However, the pressure in the chamber 16, acting on the piston head 31 continues to urge it to the left, causing the thrust washer 62 to advance against the lugs 68 and 69 on each of the radial levers 64 and 65. The radial levers pivot about their respective fulcrums 70 and 70' causing the outermost ends of each lever to move towards the right since the thrust plate 66 on which the fulcrums act is held against further axial movement by the spacer washer 72, spring 73 and locating bushing 57 which engages the shoulder 25.

As the outer portion of the radial levers 64 and 65 move to the right, the L-shaped thrust bushing 59 is urged in the same direction, causing the expansion bushing 37 to slide axially relative to the tubular sleeve 36 on the piston head 31. As this axial movement is occurring, the frustoconical circumferential portion 38 on the expansion bushing 37 urges the ball members 54 radially outwardly, thereby expanding the collar 46 on the locking bushing 44 into frictional engagement with the inner wall 12 of the cylinder 11. The force utilized in expanding the collar 46 is of course directly proportional to the force acting on the piston 31, and serves to prevent further movement of the locking bushing 44 relative to the cylinder 11.

It can be appreciated that further movement of the piston and rod is restrained, as continued or increased application of pressure to the working face of the piston 31 serves only to urge the expansion bushing 37 rearwardly exerting more radial force against the collar 46 on the locking bushing 44 for tighter gripping action. To enhance this action, the collar 46 may be faced with any suitable friction material limited only to materials which will not score, mar or scratch the inner wall 12 of the cylinder 11.

The amount of restraining force required to initiate the locking action may be varied as required. Once the size of the cylinder and leverage ratio (established by the radial levers) is determined, then the amount of restraining force to initiate the locking action may be selected by the amount of pre-loading force on the spring 42. For example, assume a restraining force is applied to the piston rod 22 at the threaded end 23 in FIG. 1 on introduction of the working fluid. Assume, further that the restraining force is non-yielding as would be the case when a rigid object is encountered. Under these circumstances, action above described will occur and the parts will assume the relationship illustrated in FIG. 2. The net force in the direction of piston rod advance can be calculated from the fluid pressure, the net area of the piston head 31 and the leverage ratio of the radial levers 64 and 65. The leverage ratio may be readily determined by the effective length of the lever arms to the fulcrum formed by the bend in the radial levers. Assuming a leverage advantage of two to one, the net force applied to the piston rod will be the pressure times the effective area of the piston and rod end minus the preloaded force of the spring 42, times the leverage ratio of the radial levers 64 and 65, ignoring all friction losses.

A different action is obtained if the force resisting further advance of the piston rod 22 is a force that will ultimately yield after first initiating the locking action described above. Under this condition, the relationship between the parts forming the piston assembly 29 and locking assembly 30 in the finally locked position assume the relative positions shown in FIG. 3. The total advance permitted after the locking action is initiated may be established by the design thickness of the spacer member 72 together with the forces developed by resistance of the annular flat spring 73. Generally this will be of the order of less than one-half inch.

When the flat spring 73 is deflected to the condition shown in FIG. 3, wherein its outer periphery is engaged by washer 56 and thrust plate 66, the locking assembly 30 is essentially locked against itself and the only force applied to the piston rod and hence against the yielding object, is that developed by the pressure times the area of the end of the piston rod 22 which force obviously will be of nominal value even at fairly high pressures.

During the movement occurring after locking action has been initiated, the spacer member 72 at the inner periphery of the annular flat spring means 73 is driven toward shoulder 25 causing the spring to flex to the position shown and to act as a resisting force to hold the thrust plate 66 against the fulcrum 70 on the levers. The locking bushing 44 therefore remains locked. This action can be better appreciated by assuming that the safety cylinder 10 is used to operate a window or the like. Assume further that a person's hand was caught in the window on closing, thus providing a reacting force resisting further extension of the piston rod 22. The initial locking action will begin as explained in conjunction with FIG. 2, exerting a clamping force on the wall 12 by the bushing 44. Since the locking bushing 44 is already lightly gripping the inner wall 12 of the cylinder, any further piston rod movement is limited to a value which is determined by the thickness of the spacer bushing 72 and which is of such small magnitude as to avoid injury. Such movement deflects the annular spring means 73 and so holds the thrust plate 66 against the levers 64 and 65.

Accordingly, further application of force by the fluid acting on the piston 31 is effectively reversed in direction and ultimately acts radially so that the locking bushing 44 is urged with a heavier clamping force against the wall 12. Thus the obstruction, which was identified in this example as a person's hand may be readily withdrawn uninjured. Obviously, the above application of the safety cylinder is only exemplary of the multiple uses envisioned. Unlocking of the mechanism for further operation is accomplished by introduction of fluid through the port 20 and venting port 15, which causes the piston 31 to move towards the nut 28. Sufficient clearances are provided to permit this application of pressure fluid to piston 31, which retracts rod 22.

My invention using compressed air as working fluid is particularly well adapted for actuating the movable jaw of a vice or clamp. The object to be held is placed against the fixed jaw, and the movable jaw driven into contact by my cylinder. The speed of operation is high, as is characteristic of pneumatic cylinders, but the danger of crushing a man's hand, for example, is eliminated. Since the clamping force available from my cylinder is greater than the product of the air pressure and cross sectional area of the cylinder, the size of the cylinder may be reduced, thus saving both cost and space. Alternatively, the air pressure could be reduced, thus maximizing cylnider life. Objects of varying dimension may be clamped without adjustment of the cylinder stroke, since its action is initiated automatically at any point in its stroke. Even yieldable objects, such as those fabricated from synthetic resin, may be firmly held without damage by such a clamp.

Despite these highly desirable characteristics, my cylinder is not dependent for its operation upon maintenance of unusually close tolerances. On the contrary, it will be apparent that considerable wear of the moving parts may occur without serious malfunction.

While the foregoing design has been explained in conjunction with a single embodiment, it is obvious that numerous modifications may be made. For example, as noted briefly above, the locking bushing may be partially slit in one or more places or may be formed from multiple annular sections. Any material with a desirable co-efficient of friction may be used as a facing for the locking bushing 44, particularly those materials which will exert sufficient gripping force even though the walls of the cylinder are lubricated.

Accordingly, it will become obvious to those skilled in the art that modifications may be made without departing from the inventive concepts embodied herein. Therefore, only such limitations should be imposed as fall within the spirit and scope of the appended claims.

I claim:

1. Locking means for frictionally locking a piston rod to a cylinder bore when said rod encounters a resisting force of predetermined magnitude, said locking means including a locking bushing adapted to engage a cylinder bore, expansion means carried on said piston rod, said expansion means being adapted for axial movement relae to said rod thereby to expand said locking bushing rried on said piston rod into engagement with said bore, eans co-operating with said expansion means to move e same in a direction opposite to the movement of said ston rod for effecting said engagement, said last named eans being actuated by a piston head floatingly carried said piston rod when said piston head moves relative said rod.

2. The locking means of claim 1 wherein said means -operating with said expansion means to move it axially includes radial lever means having a fulcrum acting ainst a thrust washer, and spring means backing said rust washer to maintain said expansion means shifted ially to expand said locking bushing on yielding of said sisting force after locking action has been initiated.

3. Locking means for frictionally locking a piston rod a cylinder bore when said piston rod encounters a resting force of predetermined magnitude, said locking eans including a piston head supported on said piston d for movement relative thereto, expansion means carried on said piston rod and being adapted for axial movement relative to said piston head, a locking bushing carried on said piston rod and movable relative thereto, eans co-operating with said expansion means to expand id locking bushing when said expansion means moves lative to said piston head, and lever means co-operating ith said piston head to shift said expansion means axial relative to said piston head thereby to urge said locking bushing radially into engagement with said cylinder ore when a resisting force of predetermined magnitude applied to said piston rod.

4. A safety cylinder including a cylinder having a pair end caps closing off opposite ends, a piston rod slidably ceived through one of said end caps, fluid inlet and outlet eans at opposite ends of said cylinder, a self-locking head rried on an inner end portion of said piston rod within id cylinder, said self-locking head including a piston ead assembly supported on said piston rod and adapted r sliding circumferential engagement with the inner wall said cylinder and a locking assembly positioned adjacent id piston head, said locking assembly including a locking bushing, means to expand said locking bushing when e magnitude of the force resisting advance of said piston d exceeds a predetermined amount, said means to expand said bushing including radial lever means disposed ithin said locking bushing and pivotable in response to lative movement between said piston head assembly and id piston rod, an expansion bushing adapted to be shifted ially on pivoting of said radial lever means when the action force on said piston rod exceeds a predetermined mount, means disposed circumferentially of said expansion means and being engageable with an inner circumrential portion of said locking bushing for expanding e same on axial movement of said expansion means, rust washer means to provide a fulcrum for pivoting said radial lever means, and means backing said thrust late during further advance of said piston rod thereby maintain said locking bushing locked when said resisting rce is yielding.

5. The safety cylinder of claim 4 wherein said means acking said thrust washer against movement in the direction of the advance of said piston includes spring means acting with said locking bushing means whereby said cking bushing will be locked independently of further ovement of said piston rod.

6. In a fluid motor of the type including a cylinder having a bore, end closures sealed thereto and defining ports and a piston rod sealed through one of the end closures, the improvement which includes a piston on the rod in the bore slidably sealed to both the rod and the bore, expandable locking means carried by the rod for expansion into firm frictional engagement with the bore, resilient means urging the locking means and piston apart and actuating means engageable with the locking means, said actuating means being disposed in the path of the piston and operable in a direction opposite the movement of said piston for actuating the locking means upon motion of the piston toward the actuating means, said actuating means including a force multiplying lever movable by said piston for forcing the piston rod axially outwardly, said lever reacting on said locking means to cause radial expansion thereof into firm frictional engagement with said bore.

7. The structure defined in claim 6 wherein said lever incorporates a fulcrum spaced from the midpoint of the lever.

8. The structure defined in claim 6 wherein said lever provides mechanical advantage for increasing the force on the piston rod when said lever is moved by said piston.

9. Locking means for frictionally locking a piston rod to a cylinder bore when said piston rod encounters a resisting force of predetermined magnitude, said locking means including a piston head supported on said piston rod for movement relative thereto, expansion means carried on said piston rod and being adapted for axial movement relative to said piston head, a locking bushing carried on said piston rod and movable relative thereto, means cooperating with said expansion means to expand said locking bushing when said expansion means moves relative to said piston head, and lever means co-operating with said piston head to shift said expansion means axially relative to said piston head thereby to urge said locking bushing radially into engagement with said cylinder bore when a resisting force of predetermined magnitude is applied to said piston rod, said means co-operating with said piston head to shift said expansion bushing relative thereto including radial lever means adapted to reverse the direction of force applied by movement of said piston head relative to said rod.

10. The locking means of claim 9 wherein thrust plate means co-operates with said lever means to provide an axially rigid fulcrum irrespective of further advance of said piston rod.

11. The locking means of claim 10 wherein spring means holds said thrust plate to maintain said locking bushing expanded during further movement of said piston rod after locking action is initiated.

References Cited by the Examiner

UNITED STATES PATENTS

| | | | |
|---|---|---|---|
| 435,139 | 8/1890 | Frolich | 92—28 X |
| 1,578,997 | 3/1926 | Hulshizer | 92—28 |
| 2,515,712 | 7/1950 | Horton et al. | 92—14 X |
| 3,150,569 | 9/1964 | Attermeyer | 92—14 |
| 3,242,826 | 3/1966 | Smith | 92—84 X |
| 3,272,087 | 9/1966 | Culver | 92—24 |

FOREIGN PATENTS 898,260  6/1962  Great Britain.

MARTIN P. SCHWADRON, *Primary Examiner.*

I. C. COHEN, *Assistant Examiner.*